Oct. 27, 1964  H. E. WOLFF  3,154,097
LIFT PLUG OPERATOR
Filed July 31, 1961
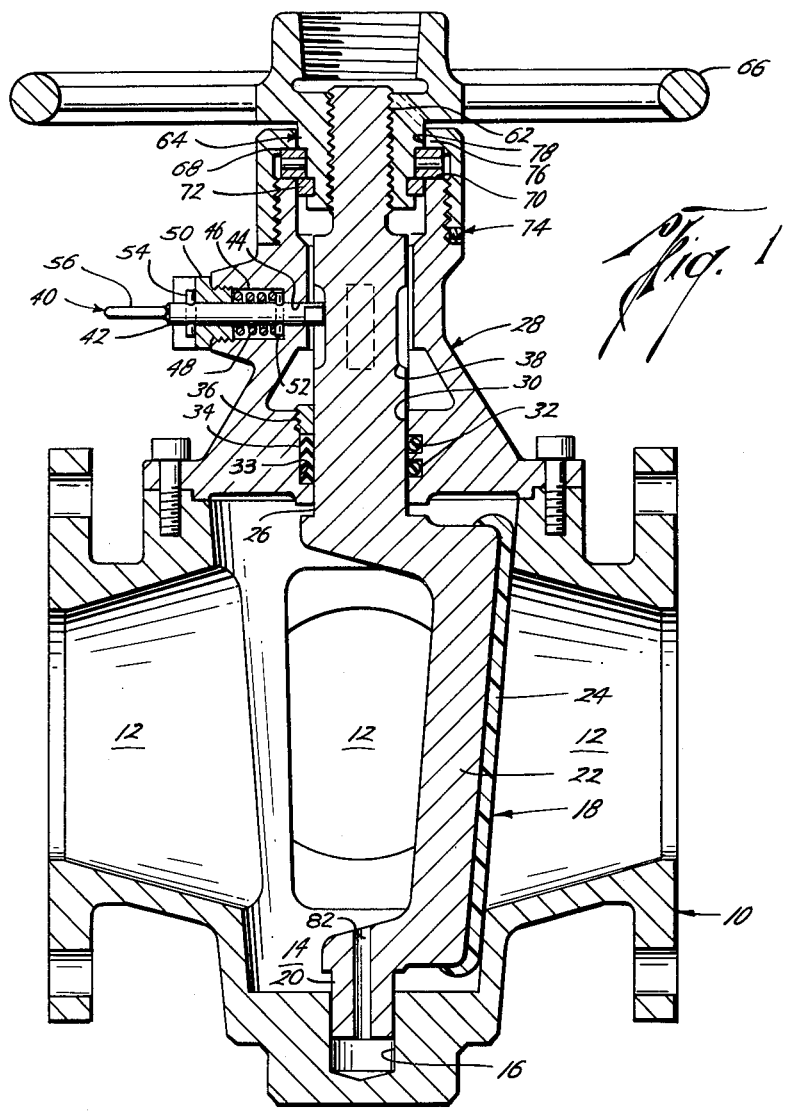
Harold E. Wolff
INVENTOR.
BY
Russell E. Schloff
ATTORNEY

United States Patent Office 3,154,097
Patented Oct. 27, 1964

3,154,097
LIFT PLUG OPERATOR
Harold E. Wolff, Houston, Tex., assignor to ACF Industries, Incorporated, New York, N.Y., a corporation of New Jersey
Filed July 31, 1961, Ser. No. 127,966
5 Claims. (Cl. 137—556)

This invention relates to a multi-way, tapered, rotary plug valve having an operator which will axially move the valve member from its seat before rotating the valve member to another position and upon reaching such position will axially move the valve member back into contact with its seat.

The present invention is directed to the problem of providing a multi-way, tapered, rotary plug valve with an operator which will disengage the valve member or plug from its seat before the valve member is rotated to a different position and which will upon reaching the new position reseat the valve member. At present there are tapered, rotary plug valves which are provided with operators in which the valve member is adapted to be lifted from its seating contact before rotation of the valve member to a different position. However, these valves are often provided with two operated handles each of which function separately. One handwheel lifts the valve member from its seat and the second handwheel rotates the valve member to the proper position. The requirement of having two separate operations is undesirable. There are other designs in which only one handwheel is involved; however, most of these designs incorporate a complicated system of levers, guides, gears, and other mechanisms which make the operator expensive to manufacture and often because of the complicated arrangement are defective in action. There are other operators which are designed to lift the valve member before rotating it, but which do not reseat the valve member after moving it to the new position. This is a defect which permits the fluid being controlled to pass around the valve member and in the event of a multi-way valve may permit too great an amount of leakage into the supposedly closed port. Other lift plug operators require that part of the operating mechanism be incorporated as a part of the valve member itself which again makes the overall valve expensive to manufacture and maintain and moreover subjects part of the operating mechanism to the flow of the lading passing through the valve.

It is an object of the present invention to provide a tapered, rotary plug valve having an improved operator which will axially move the valve member from its seat before rotating the valve member to another position, and which will reseat the valve member upon completion of the rotary movement.

It is a further object to provide an improved operator for a tapered, rotary plug valve which is economical to manufacture and easy to operate.

In order to overcome the objections of the prior art operators, the tapered, rotary plug valve of the present invention has an operator which is simple to manufacture and operate. The terminal end of the stem is threaded and engaged with a handwheel which, if the stem is held stationary, will cause axial movement of the valve member. A spring-loaded stop pin is mounted in the bonnet which co-operates with slots in the stem of the valve member to permit rotation in only one direction. However, the stop pin may be reversed to change direction of rotation. Friction between the plug and its seat will retain the valve member stationary and rotation of the handwheel will cause the valve member to axially move upward until the drag is increased at which time further rotation of the handwheel will move the valve member to the new position. The stop pin will co-operate to hold the stem stationary during reseating. As can be seen from the above, the operator is quite simple and by utilizing as many slots in the stem as there are positions for the valve member the mechanism can be adapted for either two-way, three-way, or four-way flow operation.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purpose of illustration and description and is shown in the accompanying drawings, forming a part of the specification, wherein:

FIG. 1 is a vertical cross-sectional view of a tapered, rotary plug valve having an operator which will axially lift the plug from its seat before rotating.

FIG. 2 is a top plan view showing the co-operation between the slots and stop pin.

Referring now to the drawings, the tapered, rotary valve has a housing 10 having a plurality of ports 12 which open into and communicate with a centrally located open-ended valve chamber 14. The housing may have two ports for a through flow valve or may have three or four ports for a transfer valve. The wall of the valve chamber 14 is generally a frusto conical surface which will be referred hereinafter as tapered. Centrally located in the bottom wall of the valve chamber is a bore 16. Positioned in the valve chamber 14 is a valve member 18. The valve member 18 has a bottom stem 20 which is journaled in the bore 16 and has a segment 22 which is designed to cover one of the ports 12, and the wall of the chamber adjacent to the port forms the seat. The segment 22 is tapered similarly to the wall of the valve chamber 14. The surface of the segment 22 may be provided with a coating 24 of synthetic rubber or other deformable material which will conform to any slight irregularities in the surface of the wall of the valve chamber which surrounds the port and help to more easily establish an effective seal about such port. Integrally attached to the top of the segment 22 is a stem 26 which extends outward through the opening of the valve chamber 14. The valve member 18 is rotatable within the valve chamber to cover one of the ports 12. If it is a through-way valve, covering one of the ports will stop flow through the valve. If it is a multi-way valve, positioning the segment 22 over one of the ports will prevent flow through that port and direct flow through the other ports which are not closed. As is known in the industry, the segment if so desired may be so designed as to cover two ports especially if it is a valve having four ports. Valves of this type are well known in the industry and oftentimes referred to as transfer valves.

Since rubber is used to help effect the seal about the port, it is difficult to simply rotate the valve member from one port to another due to the frictional drag between the material forming the valve and the material of the housing. Also, the valve depends for its sealing qualities on the valve member 18 being forced into intimate contact with its seat. It is therefore desirable that before the valve member 18 is rotated that the segment 22 be lifted from sealing contact so that there will not be too much drag. It is to the provision of an improved operator to accomplish this purpose that this invention is particularly directed.

The open end of the valve chamber 14 is closed by a bonnet 28 which is sealingly secured to the top of the housing. The bonnet 28 has a passage 30 through which the stem 26 extends. In order to prevent the escape of fluid between the stem 26 and passage 30 a seal is provided. The drawing shows two simple methods of providing such seal. For example, the right-hand side of the drawing shows the passage 30 having two grooves in which are placed pressure-acting O-rings 32. On the left-hand side of the drawing, there is adjustable type packing. To provide such packing, the passage 30 is provided with a larger bore 33, the top of which is threaded. Chevron sealing rings 34 are positioned in the bore 33 and a threaded member 36, which is threadedly engaged with the threads of the bore 33, retains pressure on the Chevron rings 34. As mentioned, this second type of packing is adjustable. Other types of stem packing may be used if desired.

Outwardly of the passage 30 the stem 26 is provided with a number of longitudinally extending slots 38 which define stop surfaces. The number of slots 38 will depend upon the number of positions for the valve member 18. For example, the valve shown is a four-way valve and consequently the stem 26 is provided with four slots 38, as can be seen in FIG. 2. A three-way valve may also have four slots, one being for a neutral position. The slots 38 are of an approximate length permitting the necessary axial upward movement of the valve member 18. Naturally, the distance between the top of the segment 22 and the bottom of the bonnet 28 is also sufficient to allow adequate axial movement of the valve member 18. Co-operating with the slots 38 is a spring-loaded stop pin 40 which will hold the stem 26 and valve member 18 non-rotative in one direction. To form the spring-loaded stop pin 40, the bonnet 28 is provided with a boss 42 which has an opening 44 through which the front end or nose of the stop pin 40 extends. Exteriorly of the opening 44 the boss 42 is provided with an enlarged opening 46, the outer portion of which is provided with threads. In the enlarged portion 46 is located a spring 48. The opening 46 is closed by a threaded plug 50. The stop pin 40 is provided with a transverse member 52 which extends through the pin 40 at approximately the juncture between the opening 44 and enlarged portion 46. The spring 48 co-operates with the bottom of the threaded plug 50 and the transverse member 52 to keep the stop pin 40 biased inwardly toward the stem 26. To limit the inward movement of the stop pin 20, the stop pin may be provided with a further transversely extending member 54. The outer end of the stop pin terminates in a handle portion 56. The front end of the stop pin 40 has a straight portion 58 (see FIG. 2) which co-operates with the straight wall of the slot 38 to prevent any rotary movement of the stem 26. The nose of the stop pin 40 also has an inclined cam portion 60 which will permit the slot 38 to rotate past the pin permitting rotary movement of the stem 26. The handle 56 is so positioned that when it is transverse to the stem 26 the straight portion 58 is on one side or the other of the slot 38 permitting rotary movement in one direction or the other. In order to show the location of the straight portion 58 on the front end of the stop pin 40, the handle 56 has an arrow indicating the direction in which the plug may be rotated, see FIG. 2. The other side of the handle 56 has an arrow pointing in the opposite direction. Whether or not the valve member 18 can be rotated will depend upon the position of the stop pin 40. If the straight portion 58 abuts the wall of the slot 38 in the direction of rotation, no rotation will be possible; whereas if the stem 26 is rotated in the direction of the inclined portion 60, the stem 26 can be rotated. In this connection the stop pin 40 can act as a lock, however, it has a more important function as will be explained subsequently.

Axially outward of the longitudinally extending slots 38 the stem 26 is reduced in diameter and provided with threads 62. Engaged with the threads 62 is a threaded hub portion 64 of a handwheel 66. To retain the handwheel 66 on the bonnet and to take care of the thrust developed by the axial movement of the valve member 18, a bearing 68 is placed between the hub 64 and the top 70 of the bonnet 28. A split ring 72 located in a groove in the hub 64 acts as a surface for the inner end of the bearing 68. The end of the bonnet 28 is threaded and a threaded bearing cap 74 is engaged with the threads on the end of the bonnet 28 and has a portion 76 which overlies the bearing 68 as does a shoulder 78 formed on the hub 64. In order to provide a visual indication of the location of the segment 22, the top of the stem 26 is provided with an indicator 80 which is a facsimile of the segment 22 which will show the exact location of the segment 22.

The length of the slots 38 and the distance between the inner end of the hub portion 64 and the enlarged portion of the stem 26 are such that upon axial outward movement of the stem 26 the lower stem 20 will not become disengaged from the bore 16. Also, the distance between the top of the segment 22 and the bottom of the bonnet 28 is sufficient to permit the necessary axial movement of the segment 22 so that it will no longer bind with the co-operating surface of the wall of the chamber 14. Since there is no seal between the stem 20 and bore 16, the stem 20 may be provided with a passage 82 which will permit fluid to enter or escape upon axial movement of the valve member 18.

In order to operate the valve, the stop pin 40 is turned to the direction in which it is desired to rotate the valve. The indicator-direction arrow on the handle 56 of the stop pin shows such direction. The handwheel 66 is then rotated counterclockwise to axially raise the valve member 18. If the desired direction of rotation of the valve member is also counterclockwise, the drag between the surface of the segment 22 and the wall of the chamber 14 will cause the stem 26 to remain stationary and rotation of the handwheel 66 will result in further engagement of the threaded portion 62 of the stem 26 and hub 64 causing the stem 26 to rise which will cause the segment 22 to be moved axially upward from contact with its seat. After the plug has lifted sufficiently to decrease the drag between the segment 22 and the wall of the chamber 14, the stem 26 will rotate causing the segment 22 to also rotate. The freeing of the plug may take place by either the valve member being raised axially far enough to decrease the drag or the enlarged part of the stem 26 may contact the hub 64 of the handwheel 66 and the friction between these two surfaces plus the prior axial movement will be such to permit rotation of the valve member 18. After the valve member 18 is free to turn, further rotation of the handwheel 66 will result in rotation of the valve member 18. The amount of movement may be ascertained by watching the indicator 80. When the indicator 80 shows that the segment 22 is opposite the proper port 12, the stop pin 40 will automatically be in one of the slots 38. To seat the valve member 18, the handwheel 66 is rotated clockwise which will cause disengagement of the threaded portion 62 of the stem 26 and hub portion 64 axially lowering the valve member 18 until the segment 22 is in intimate sealing contact with the wall of the chamber adjacent to the selected port 12. When the rotation is reversed, the straight portion 58 of the stop pin 40 will be abutting the slot 38 and rotary movement of the stem 26 will be resisted resulting in axial movement of the stem 26.

In order to raise the valve member 18 from its seated position, the handwheel 66 is always turned in a counterclockwise direction which is the normal direction that a gate valve is turned to open it. In order to seat the valve member 18, the handwheel is turned clockwise which is the direction a valve is normally turned to close it. Since in addition to the axial movement to unseat the valve member rotary movement is necessary to turn the valve to the proper position, it may be necessary in certain instances to reverse the nose of the stop pin 40 which can be easily accomplished by simply pulling out the stop pin 40 by its handle 56 and turning the pin 40 180°. The handle 56 will always show, by its indicating arrow, in which direction the valve member 18 can be rotated. As this operator is particularly designed for utilization with multi-way valves, the stop pin 40 will normally not have to be disturbed unless for some reason it is desired to reverse direction of rotation. However, it will always require counterclockwise rotation of the handwheel 66 to raise the valve member 18 and clockwise rotation of the handwheel 66 to lower the valve member 18. The direction arrow on the handle 56 will always show the direction in which the valve member 18 can be rotated.

As can be seen from the foregoing, the present invention discloses a tapered rotary plug having a simple and inexpensive operator which will axially raise the valve member 18 before rotating it and will upon completion of the rotary cycle axially lower the valve member 18 into intimate sealing engagement with its seat.

What I claim is:

1. A rotary plug valve positionable in a plurality of positions comprising:
  a housing provided with an open ended tapered valve chamber having a number of ports communicating with said chamber and having a generally centrally located bore in the bottom wall of the valve chamber;
  a rotatable valve member positioned in the valve chamber, said valve member having:
  a stem journaled in the centrally located bore,
  a tapered segment co-operable with the wall of the chamber adjacent one of the ports to seal said port,
  a stem extending from the segment through the open end of the valve chamber, the stem having a number of longitudinally extending slots formed therein defining stop surfaces, said stem having its terminal end reduced in diameter and provided with threads and having segment position indicating means thereon;
  a bonnet sealingly secured to the housing closing the open end of the valve chamber, said bonnet having:
  a sealed aperture for the passage of the stem,
  a stop pin rotatably mounted on said casing for selecting the direction of stem rotation, said stop pin having a nose portion spring biased toward and into cooperation with the slots in the stem, the nose portion having a surface thereof adapted to engage one of said stop surfaces to prohibit stem rotation in one direction, and a cam portion which permits rotation of the stem in the opposite direction, a handle for rotating the stop pin between each of plural positions and indicia on each of plural sides for showing the position of the nose of the pin;
  a handwheel having a threaded hub portion which is engaged with the threaded end of the stem whereby when rotation of the stem is prohibited by the stop pin axial movement of the stem occurs;
  a bearing positionable between the axial outer end of the bonnet and the hub portion;
  a bearing retainer cap secured to the bonnet and having a portion overlying the bearing.

2. A rotary plug valve positionable in a plurality of positions comprising:
  a housing provided with an open-ended tapered valve chamber having a number of ports communicating with said chamber and having a generally centrally located bore in the bottom wall of the valve chamber;
  a rotatable valve member positioned in the valve chamber, said valve member having:
  a stem journaled in the centrally located bore,
  a tapered segment co-operable with the wall of the chamber to establish a seal about at least one port,
  a stem extending from the segment through the open end of the valve chamber, the stem having a number of longitudinally extending slots formed therein defining stop surfaces, and having its terminal end reduced in diameter and provided with threads;
  a bonnet sealingly secured to the housing closing the open end of the valve chamber, said bonnet having:
  a sealed aperture for the passage of the stem,
  a stop pin rotatably mounted on said bonnet for selecting the desired direction of stem rotation, said stop pin having a nose portion spring biased toward and into cooperation with the slots in the stem, the nose portion having a surface thereon adapted to engage one of the stop surfaces to prohibit stem rotation in one direction and a cam portion which permits rotation of the stem in the opposite direction, a handle for rotating the stop pin between each of plural positions and having indicia on each of plural sides for showing the position of the nose of the pin;
  a handwheel having a threaded hub portion which is engaged with the threaded end of the stem whereby when rotation of the stem is prohibited by the stop pin axial movement of the stem occurs;
  a bearing positionable between the axial outer end of the bonnet and the hub portion;
  a bearing retainer cap secured to the bonnet and having a portion overlying the bearing.

3. A rotary plug valve positionable in a plurality of positions comprising:
  a housing having an open-ended, tapered valve chamber and at least two ports communicating with said valve chamber;
  a valve member having a stem extending through the open end of the valve chamber rotatably mounted in said valve chamber, the stem having a slot defining stop surfaces for each position of the valve member and having its axial outer end threaded;
  a bonnet closing the open end of said valve chamber, said bonnet having:
  a sealed aperture for the stem,
  a rotatable stop pin having a nose portion spring biased toward and into cooperation with the slots in the stem, the nose portion having a surface thereon adapted to engage one of the stop surfaces to prohibit rotation of the stem in one direction, a handle for rotating the stop pin between each of plural positions for selecting the desired direction of stem rotation and having indica on each of plural sides for showing the direction of stem rotation;
  a handwheel having a threaded hub portion engaged with the threaded end of the stem whereby when rotation of the stem is prohibited by the stop pin axial movement of the stem occurs;
  a bearing positionable between the outer axial end of the bonnet and the hub,
  means for securing the hub for rotational movement within the bonnet.

4. A rotary plug valve positionable in a plurality of positions comprising:
  a housing provided with an open-ended tapered valve chamber having a number of ports communicating with said chamber and having a generally centrally located bore in the bottom wall of the valve chamber;
  a rotatable valve member positioned in the valve chamber, said valve member having:
  a stem journaled in the centrally located bore,
  a tapered segment-co-operable with the wall of the chamber adjacent one of the ports to seal said port,
  a stem extending from the segment through the open end of the valve chamber, the stem having a number of longitudinally extending slots formed therein defining stop surfaces, and having its terminal end reduced in diameter and provided with threads;
  a bonnet sealingly secured to the housing closing the open end of the valve chamber, said bonnet having:
  a sealed aperture for the passage of the stem, a stop pin rotatably mounted on said bonnet for selecting the desired direction of stem rotation, said stop pin having a nose portion spring biased toward and into cooperation with the slots in the stem, the nose portion having a surface thereon adapted to engage one of the stop surfaces to prohibit stem rotation in one direction and a cam portion which permits rotation of the stem in the opposite direction, a handle for rotating the stop pin between each of plural positions and having indicia on each of plural sides for showing the position of the nose of the pin;

a handwheel having a threaded hub portion which is engaged with the threaded end of the stem to permit axial movement of the valve member upon the valve member being held non-rotative and which upon freeing of the valve member will rotate the valve member;

a retainer cap securing the handwheel to the bonnet.

5. In a rotary plug valve having a valve body defining a valve chamber and a bonnet fixed to the valve chamber, a plug member positioned within the valve chamber and being controlled by a valve stem for both rotational and vertical movement, the improved comprising:

a plurality of longitudinal slots formed in said stem defining stop surfaces, a stop pin rotatably mounted on said bonnet between a plurality of positions for selecting the direction of desired stem rotation, said pin having a nose portion spring biased toward and into cooperation with the slots in the stem, the nose portion having a first surface which is engaged by one of said stop surfaces to prevent stem rotation in one direction, the nose portion having a cam surface opposite the first surface, said nose portion upon being rotated to a second of said plural positions being so positioned that said first surface engages one of said stop surfaces to prevent stem rotation in said opposite direction and said cam surface allows rotation of said stem in said one direction.

References Cited in the file of this patent
UNITED STATES PATENTS
2,464,123    Downing et al. _____ Mar. 8, 1949